(12) United States Patent
Moon

(10) Patent No.: US 8,949,603 B2
(45) Date of Patent: Feb. 3, 2015

(54) DATABASE MANAGEMENT SYSTEM AND ENCRYPTION METHOD PERFORMED IN DATABASE

(75) Inventor: Chan Seung Moon, Seoul (KR)

(73) Assignee: Altibase Corporation, Seoul (KR)

( * ) Notice: Subject to any disclaimer, the term of this patent is extended or adjusted under 35 U.S.C. 154(b) by 0 days.

(21) Appl. No.: 13/526,360

(22) Filed: Jun. 18, 2012

(65) Prior Publication Data

US 2013/0091357 A1 Apr. 11, 2013

(30) Foreign Application Priority Data

Oct. 10, 2011 (KR) ........................ 10-2011-0103043

(51) Int. Cl.
*H04L 9/32* (2006.01)
*G06F 21/62* (2013.01)

(52) U.S. Cl.
CPC ................................ *G06F 21/6227* (2013.01)
USPC ...................................................... 713/168

(58) Field of Classification Search
CPC ......... G06F 12/14; G06F 21/60; G06F 21/78; G06F 2221/2107
USPC ....................................................... 713/168
See application file for complete search history.

(56) References Cited

U.S. PATENT DOCUMENTS

| | | | |
|---|---|---|---|
| 7,644,285 B1 * | 1/2010 | Murray et al. | 713/183 |
| 8,244,678 B1 * | 8/2012 | Hartland et al. | 707/640 |
| 8,626,749 B1 * | 1/2014 | Trepetin et al. | 707/722 |
| 2004/0230800 A1 * | 11/2004 | Futa et al. | 713/169 |
| 2005/0147246 A1 | 7/2005 | Agrawal et al. | |
| 2007/0038579 A1 * | 2/2007 | Ansley | 705/64 |
| 2007/0079140 A1 * | 4/2007 | Metzger et al. | 713/189 |

FOREIGN PATENT DOCUMENTS

KR   10-0737359   7/2007

OTHER PUBLICATIONS

Korean Intellectual Property Office, Notice of Non-Final Rejection, Korean Patent Application No. 10-2011-0103043, Aug. 22, 2013, six pages.

* cited by examiner

*Primary Examiner* — Dant Shaifer Harriman
(74) *Attorney, Agent, or Firm* — Fenwick & West LLP

(57) ABSTRACT

A database management system (DBMS) performs encryption in a DB. The system receives authentication authorization regarding a security policy of the DB from an external encryption unit that is separated from the DB and performs encryption. Important data in a column unit is selectively encrypted and an encrypted comparison code (ECC) of the important data is generated inside the DB. The encrypted important data and the corresponding ECC is generated as a single encryption data type.

26 Claims, 4 Drawing Sheets

DATABASE MANAGEMENT SYSTEM AND ENCRYPTION METHOD PERFORMED IN DATABASE

CROSS-REFERENCE TO RELATED PATENT APPLICATION

This application claims priority under 35 U.S.C. 119(a) from Korean Patent Application No. 10-2011-0103043, filed on Oct. 10, 2011, in the Korean Intellectual Property Office, the disclosure of which is incorporated herein in its entirety by reference.

BACKGROUND OF THE INVENTION

1. Field of the Invention

The present invention relates to encryption performed in database (DB).

2. Description of the Related Art

A variety of companies such as financial, securities, or social networking service (SNS) firms have recently managed database (DB) including mass customer information, and circulated various knowledge based contents such as finance, shopping, education, etc. based on the DB However, since the DB including customer information is not appropriately encrypted, credit information such as credit grades of customers, passwords thereof, etc. is frequently exposed.

For example, an accident caused private information including ID registration numbers and home addresses of about 2,000 applicants who applied for an event held by a Korean mobile communication company to be entirely exposed to Internet through Google search engine. This allowed the information to be illegally used and has emerged as a serious social problem.

To address such problems, it is indispensable to encrypt and store data included in DB. However, performance of DB to which conventional DB encryption functions are applied deteriorates several times to several tens of times compared to DBs to which DB encryption functions are not applied.

SUMMARY OF THE INVENTION

The present invention provides a database (DB) encryption apparatus and method that provide a column encryption function while not greatly deteriorating a speed of the database.

Embodiments perform an encryption method in a database (DB). The method includes receiving authentication authorization regarding a security policy of the DB from an external encryption unit that is separated from the DB and performs encryption. Important data is selectively encrypted in a column unit resulting in generation of an encrypted comparison code (ECC) of the important data inside the DB. The encrypted important data and the corresponding ECC are generated as a single encryption data type.

According to another embodiment, a database management system (DBMS) that performs encryption in a database is provided. The DBMS includes an external encryption unit separated from DB, which receives a security policy from the DB. The DBMS also includes an internal encryption unit. If authentication authorization regarding the security policy is received from the external encryption unit, the internal encryption unit is configured to selectively encrypt important data in a column unit, and generate an ECC of the important data, inside the DB. The DMBS also includes an encryption data type generation unit configured to generate the encrypted important data and the corresponding ECC as a single encryption data type.

According to still another embodiment, a non-transitory computer readable storage medium storing a computer program product including computer instructions configured to cause a processor of a computer to perform encryption in a database is provided. The computer program product includes an external encryption unit separated from DB, which receives a security policy from the DB. The computer program product also includes an internal encryption unit. If authentication authorization regarding the security policy is received from the external encryption unit, the internal encryption unit is configured to selectively encrypt important data in a column unit and generate an ECC of the important data, inside the DB. The computer program product also includes an encryption data type generation unit configured to generate the encrypted important data and the corresponding ECC as a single encryption data type.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
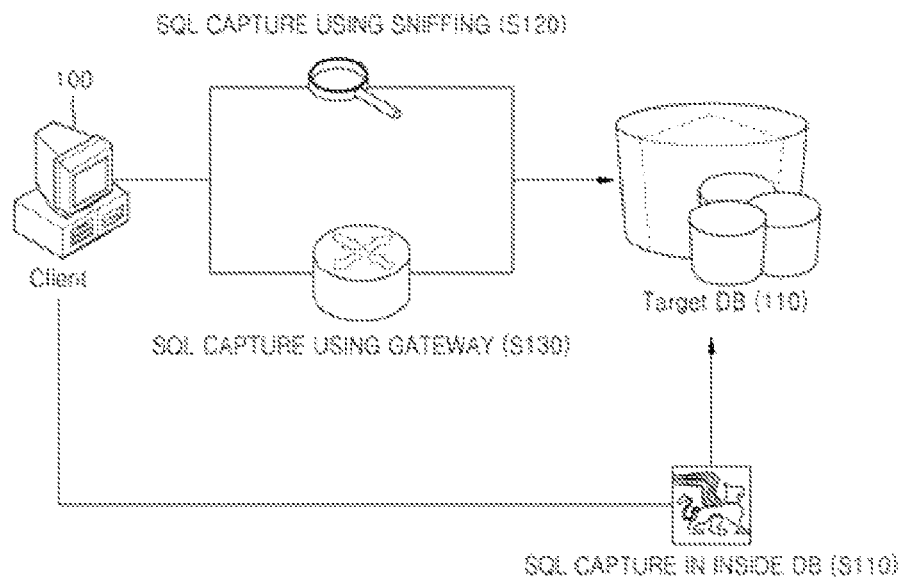
FIG. 1 illustrates access control and audit performed for database (DB) security according to an embodiment of the present invention.

The present invention will now be described more fully with reference to the accompanying drawings, in which exemplary embodiments of the invention are shown. Although the same elements are shown in difference drawings, same reference numerals designate same elements throughout the drawings.

While describing the present invention, detailed descriptions about related well known functions or configurations that may blur the points of the present invention are omitted.

Further, for more faithful understanding of the present invention, the described embodiments may be modified in various different ways, all without departing from the spirit or scope of the present invention.

FIG. 1 illustrates access control and audit performed for database (DB) security according to an embodiment of the present invention.

Referring to FIG. 1, a DB client 100 sends a request comprising a DB query to a target DB 110 using a structured query language (SQL) (S110). An SQL capture using sniffing (S120) may audit, monitor, and record DB security by capturing the SQL at a minimum load but may not shield an illegal access. An SQL capture using a gateway (S130) accesses to the target DB 110 using the gateway, and thus all accesses can be completely controlled. If occasion demands, the SQL capture using a gateway (S130) can change transmitted data in the gateway, which disadvantageously increases a server load.

Figure 2:
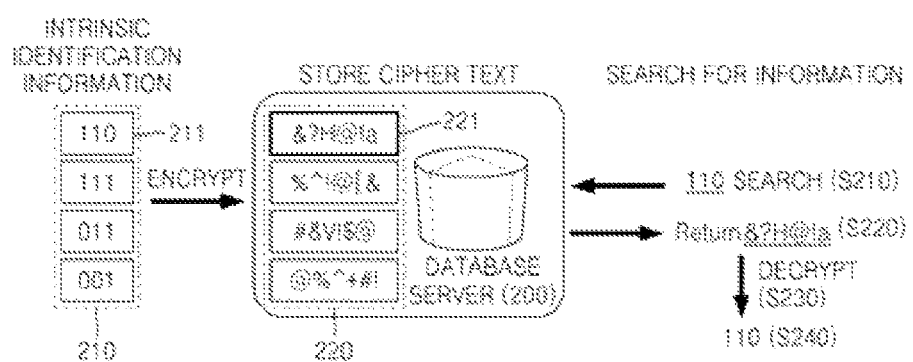
FIG. 2 illustrates an example of DB encryption.

FIG. 2 illustrates an example of DB encryption. Methods of encrypting data in a DB include methods of encrypting the whole of a DB management system (DBMS), table spaces, tables, columns (for example, ID registration number columns, password columns, etc.) included in tables, etc. The example of DB encryption shown in FIG. 2 is a general method of encrypting columns included in tables.

A DB server 200 changes and stores data of an intrinsic identification information column 210 to a cipher text 220 using a key and algorithm. For example, the DB server changes and stores data 211 "110" of the intrinsic identification information column 210 to a cipher text 221 "&?H@!a". The cipher text 220 is usually longer than a plain text and is converted into data having the same size, which requires more storage capacity. It is noted during an encryption process that the cipher text 220 must not be derived from a length, order, or pattern of the original data, etc.

A client searches for the data "110" from the DB server 200 (S210). The DB server 200 searches for the cipher text 221 "&?H@!a" corresponding to the data 211 "110" (S220), decrypts the cipher text 221 "&?H@!a" (S230), and informs the client of the decrypted data (S240).

Such DB encryption methods include external module encryption methods of monitoring input and output paths of DB and internal module encryption methods of encrypting data stored in DB.

Figure 3:
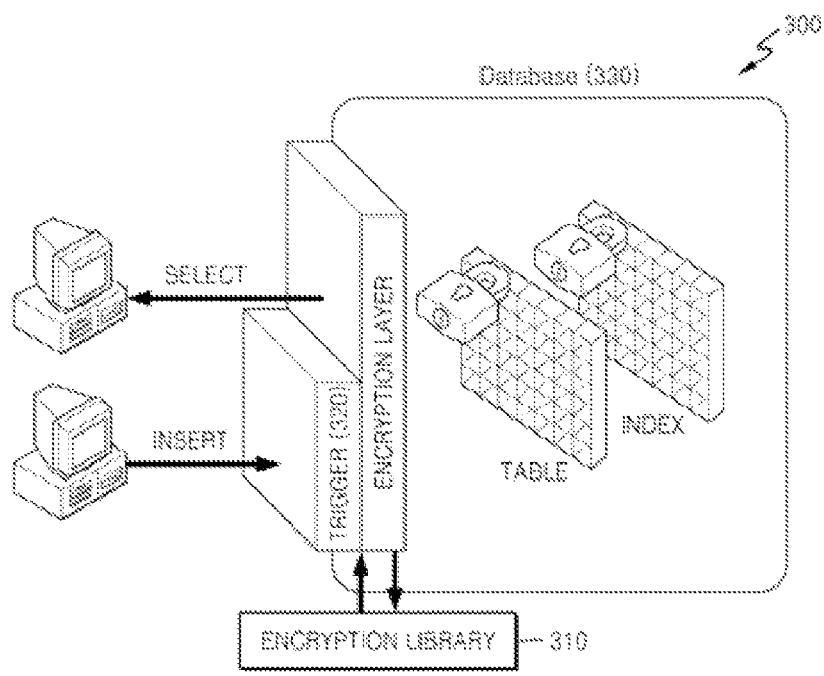
FIG. 3 illustrates an example of external module encryption performed in DB.
Figure 4:
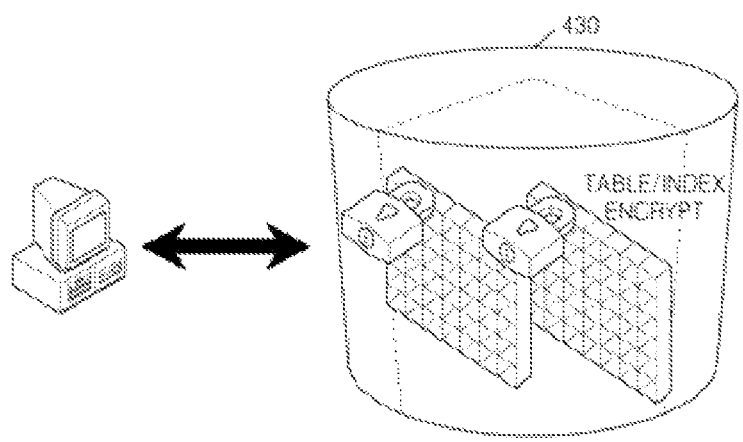
FIG. 4 illustrates an example of internal module encryption (transparent data encryption (TDE)) performed in DB.

FIGS. 3 and 4 illustrate external module encryption and internal module encryption of DB. FIG. 3 illustrates an example of external module encryption performed in DB 330. The example is a case where encryption and decryption are performed when data is input and output (300).

In this case, the external module encryption is not supported by the DB 330. Thus, data in the DB 330 is encrypted and decrypted through a DB trigger 320 or an external encryption library 310 (for example, an encryption library). Thus, an authority management of the DB 330 and a management of the external encryption library 310 are separated from each other, and thus security is high, and an improvement or exchange of the external encryption library 310 is advantageously easy.

However, the external encryption library 310 does not solve a compatibility problem, which deteriorates performance of the DB 330. A change of the external encryption library 310 involves a change of the DB trigger 320 or a calling method.

The external encryption library 310 does not directly support a data type but virtually supports the data type, and thus using of intrinsic characteristics of the data type such as an index, a primary index, a unique index, a composite index, a foreign key, not null, a trigger, etc. is limited.

Further, the DB 330 uses an index (for example, index "70") to store data and compare values so as to quickly access to the stored data (for example, first six digits of an ID registration number "701010"). However, when data is encrypted ("701010" is encrypted as "#@*!D!@@"), it is impossible to compare data until the encrypted data "#@*!D!@@" is decrypted. Accordingly, the encrypted data cannot use the index due to this reason or an index is generated through decryption and is used, which deteriorates performance of the DB 330, for example, the execution speed.

If the index cannot be used, every data must be accessed one by one, which deteriorates performance of the DB 330. If the index is generated through decryption, resources are consumed to perform decryption, and an additional security problem arises.

FIG. 4 illustrates an example of internal module encryption (transparent data encryption (TDE)) performed in DB 430. According to the TDE, encryption and decryption are automatically performed in the DB 430 using an SQL server. According to the TDE, data is automatically encrypted, is prepared in a disk, and is automatically decrypted when the data is read from a memory, and thus an intrinsic function of the DB 430 can be advantageously used.

However, according to the TDE, the DB 430 has encryption and decryption functions, which causes a lack of confidentiality of an encryption key, and thus the TDE has a problem that is vulnerable to security.

Further, authorities of a DB administrator (DBA) and a security administrator are not completely separated from each other, and a standard encryption algorithm may not be supported by the DB. This may lead to policy issues if a certain geographic region requires specific encryption algorithms to be supported by the DB. For example, if a Korean standard algorithm is not supported, the National Intelligence Service (NIS) may not allow an introduction of the TDE into Korea.

Figure 5:
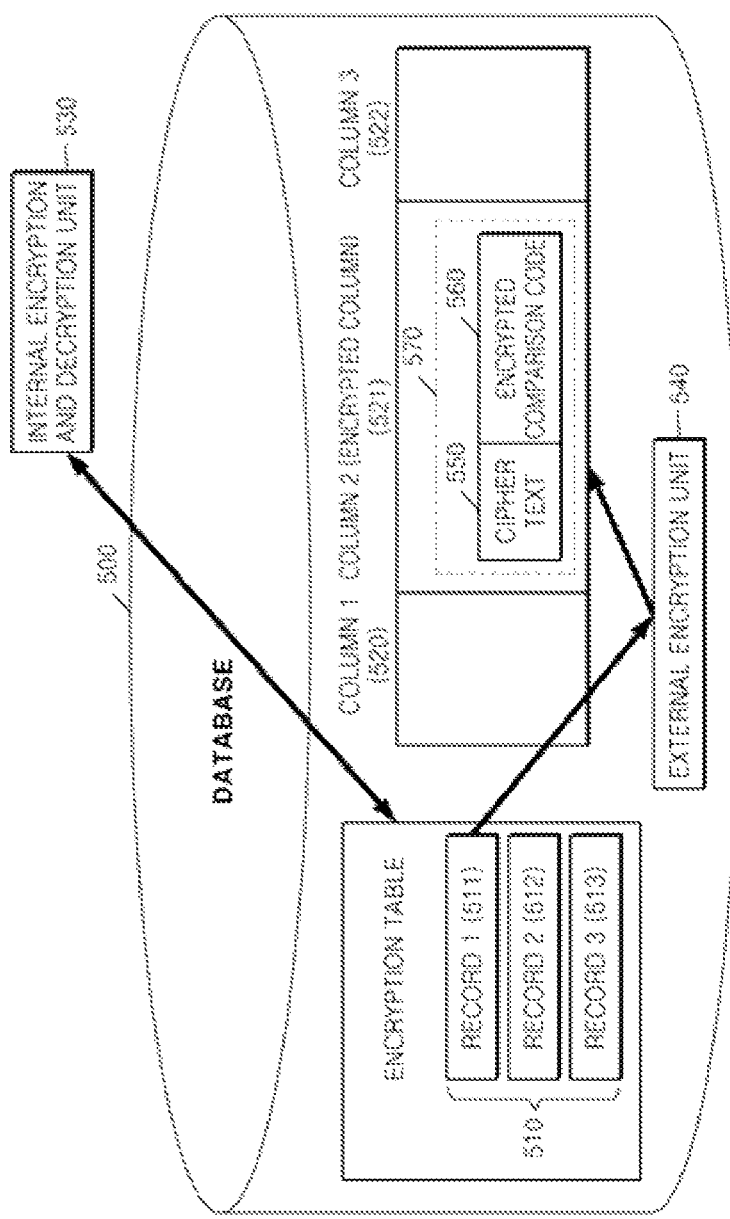
FIG. 5 illustrates a DB encryption method that has overcome disadvantages of external module encryption and internal module encryption (TDE) performed in DB, according to an embodiment of the present invention.

FIG. 5 illustrates a DB encryption method that has overcome disadvantages of external module encryption and internal module encryption (TDE) performed in DB 500 according to an embodiment of the present invention.

Referring to FIG. 5, an encryption table of the DB 500 according to the present embodiment includes a plurality of records 510.

TABLE 1

| Names (column 1, 520) | ID registration numbers (column 2, 521) | Addresses (column 3, 522) |
| --- | --- | --- |
| Gildong Hong | 460322-1234562 | 1234-1, Seocho-dong, Seocho-gu |
| Younghee Kim | 650923-2046234 | 234-5, Daechi-dong, Kangnam-gu |
| Chulsoo Kang | 900313-1250236 | 341-11, Myoungil-dong, Kangdong-gu |

Each of records 511, 512, and 513 includes a plurality of values, each value corresponding to a column 520, 521, or 522. The columns 520, 521, and 522 can be set as "names" (column 1, 520), "ID registration numbers" (column 2, 521), and "addresses" (column 3, 522), respectively, listed in Table 1 above. According to the present embodiment, a specific column (for example, "ID registration numbers" 521) can be selectively encrypted.

The DB encryption method is as follows. The DB 500 transmits a security policy to an external encryption unit 540, and receives an authentication result of the security policy from the external encryption unit 540. The security policy is a security object defined by an external security module (the external encryption unit 540) of the DB 500 and includes an access control, an encryption algorithm, an encryption key, and various encryption options (whether to use an initialization vector, etc.). The DB 500 increases confidentiality of security information necessary for encryption using an external object that is the security policy. The external security module manages the security policy independently from the DB 500.

The security policy is a name of the security object defined by the external encryption unit 540. The DB 500 simultaneously sets the access control, the encryption algorithm, the encryption key, and various encryption options regarding a column to be encrypted by specifying the security policy that is the name of the security object defined by the external encryption unit 540 in the column. In addition, the external encryption unit 540 manages the generated security policy separately from the DB 500. A security administrator can manage an access authority control, data encryption, a decryption authority control, etc. regarding the security policy while maintaining confidentiality of the security policy.

If authentication is authorized based on the authentication result from the external encryption unit 540, the DB 500 encrypts a plain text (for example, column 2 521, ID registration numbers) of a column to be encrypted through an internal encryption and decryption unit 530.

The internal encryption and decryption unit 530 encrypts the plain text (for example, column 2 521) of the column into a cipher text 550, if a user requests for a corresponding material, decrypts the cipher text 550, and transfers a data value in the plain text.

The internal encryption and decryption unit 530 also generates an encryption comparison code (ECC) 560 based on the plain text (for example, column 2 521) using an order preserving hash function. The ECC 560 advantageously has the same value if security policies are different. The ECC 560 generated using the order preserving hash function cannot be theoretically decrypted to the original plain text, and thus the ECC 450 has no security problem.

An encryption data type generation unit (not shown) stores a single encryption data type 570 by matching the cipher text 550 with the ECC 560. According to the present embodiment, the encryption data type 570 is an intrinsic data type of DB and includes an index, a primary key index, a unique index, a composite index, a foreign key, not null, a trigger, etc.

The ECC 560 can perform comparison without performing decryption, and perform an index function during a comparison, thereby achieving a quick search and a range search, and thus performance increases compared to the conventional process of decrypting every encrypted data and comparing every decrypted data. The order preserving hash function used to generate the ECC 560 satisfies the following:

If a plain text 1<a plain text 2, then Func (plain text 1)<Func (plain text 2).

Thus, an ECC 1 stored in the column 1 520 and an ECC 2 stored in the column 2 521 are compared without decrypting the encrypted column 1 or a plain text to be compared is compared to an ECC 3 generated using the order preserving hash function. Encryption and decryption using encryption and decryption algorithms is generally less costly than generation of an ECC using the order preserving hash function, and thus the order preserving hash function enables faster comparison and search than the conventional comparison after decryption.

Further, the ECC 560 does not need to be decrypted and thus can be used in a join operation. The join operation means an operation that combines relevant data and extends a table. The ECC 560 can be used to perform a process of finding the relevant data in the join operation.

The ECC 560 can be used to copy data. Data is copied by comparing binary data and processing a different part of the binary data. However, if encryption is performed during the data copy, even the same data can be encrypted to different cipher text values according to an encryption security policy. Thus, when encryption is performed during data copy, every data must be decrypted one by one, which involves consumption of many resources.

However, the ECC 560 according to the present embodiment does not change an encryption value even if the encryption security policy differs, and thus data is copied by comparing the ECC 560 of copied data and processing a different part of the ECC 560. The ECC 560 can also be used in index scan, scan filter, like operations, etc.

A decryption process is as follows. The decryption process is necessary to restore the original of data encrypted through the processes above. To this end, the DB 500 transmits a security policy to the external encryption unit 540, and receives an authentication result of the security policy from the external encryption unit 540.

If authentication is authorized based on the authentication result from the external encryption unit 540, the DB 500 decrypts the cipher text 550 through the internal encryption and decryption unit 530.

Figure 6:
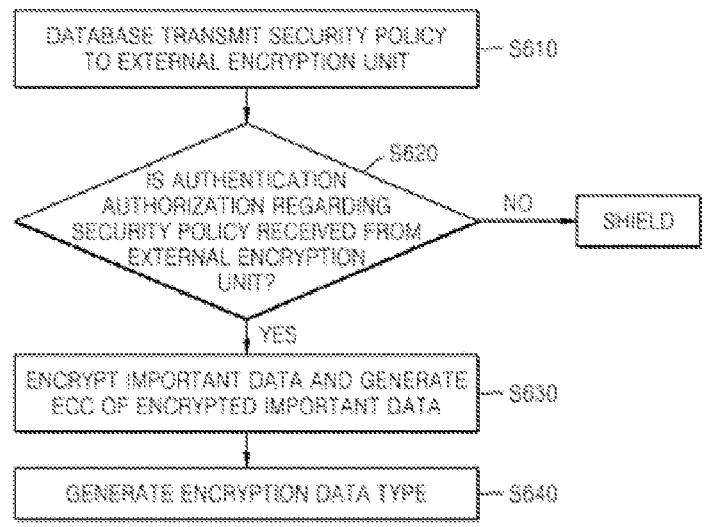
FIG. 6 is a flowchart illustrating an encryption method performed in DB, according to an embodiment of the present invention.

FIG. 6 is a flowchart illustrating an encryption method performed in DB, according to an embodiment of the present invention. Referring to FIG. 6, the DB transmits a security policy to an external encryption unit, and receives an authentication authorization regarding the security policy from the external encryption unit (S610 and S620). Then, important data is selectively encrypted in a column unit inside the DB. An ECC of the important data is generated using a hash function (S630).

Thereafter, the encrypted important data and the corresponding ECC are generated as a single encryption data type (S640). The ECC included in the encryption data type has an invariable value irrespective of the security policy, and can be used without being decrypted. Thus, the ECC can be used in data search, data copy, join, index scan, scan filter, and like operations without being decrypted.

To view the original of the encrypted important data, the DB retransmits the security policy to the external encryption unit. If the DB receives an authentication authorization regarding the security policy from the external encryption unit, the encrypted important data is decrypted inside the DB.

Figure 7:
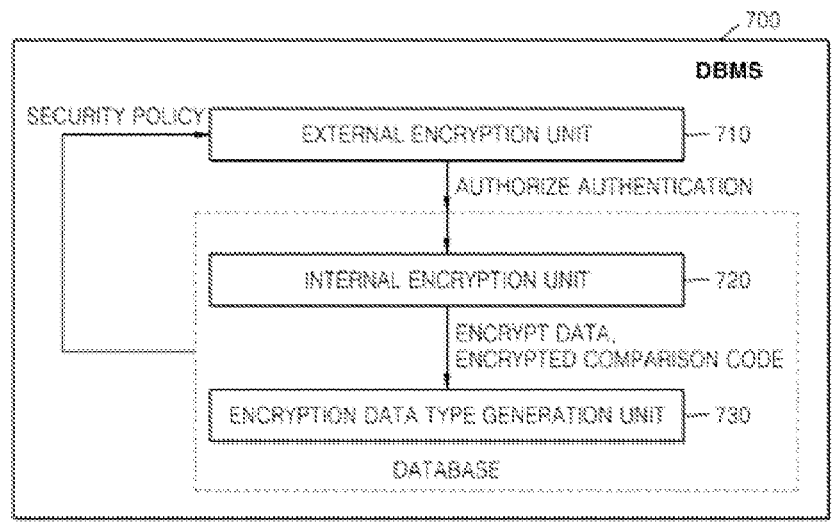
FIG. 7 is a block diagram of a DB management system (DBMS), according to an embodiment of the present invention.

FIG. 7 is a block diagram of a DB management system (DBMS) 700, according to an embodiment of the present invention. Referring to FIG. 7, the DBMS 700 includes an external encryption unit 710, an internal encryption unit 720, and an encryption data type generation unit 730.

The external encryption unit 710 is separated from DB, receives a security policy from the DB, and performs authentication on the security policy. If authorization is authenticated, the external encryption unit 710 transfers such authentication to the DB.

If authorization is authenticated, the internal encryption unit 720 included in the DB selectively encrypts important data in a column unit, and generates an ECC of the important data. The ECC is generated using a hash function, and has an invariable value irrespective of the security policy. The ECC can be used in data search, data copy, join, index scan, scan filter, and like operations without being decrypted.

The encryption data type generation unit 730 generates the encrypted important data and the corresponding ECC as a single encryption data type. According to the present embodiment, the encryption data type is used as an intrinsic data type of the DB, and thus the encryption data type can be an index, a primary index, a unique index, a composite index, a foreign key, not null, a trigger, etc.

As described above, according to an embodiment, operations such as index scan, scan filter, join, like, etc. can be performed using an ECC without having to decrypt every encrypted data stored in DB.

A decryption process is omitted during quality processing, and thus decryption is performed only when actual data is necessary, i.e. when a decrypted value is necessary, thereby effectively using resources and increasing performance of DB.

According to an embodiment, encrypted data and corresponding ECC are generated as a single encryption data type, and the encryption data type is used as an intrinsic data type in the DB, and thus the encryption data type can include an index, a primary key index, a unique index, a composite index, a foreign key, not null, a trigger, etc.

Furthermore, conventional SQL can be used without corrections, thereby increasing compatibility. The present invention may be embodied as computer-readable codes in a non-transitory computer-readable recording medium. The computer-readable recording medium may be any recording apparatus capable of storing data that is read by a computer system. Examples of the computer-readable recording medium include read-only memories (ROMs), random-access memories (RAMs), CD-ROMs, magnetic tapes, floppy disks, and optical data storage devices. The computer readable medium may be distributed among computer systems that are interconnected through a network, and the present invention may be stored and implemented as computer readable codes in the distributed system. Functional programs, codes, and code segments for embodying the present invention may be easily derived by programmers in the technical field to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A computer-implemented encryption method performed in database (DB), the method comprising:
   receiving, by the DB, information identifying an encryption algorithm from an external encryption unit that is separate from the DB;
   storing an important data of a column of a table of the DB as a single encryption data type in an encrypted column of the DB, wherein an instance of the single encryption data type based on an input data item of the important data is obtained by combining:
      (a) an encrypted comparison code (ECC) value obtained by applying an order preserving function to the input data item, wherein the ECC value cannot be decrypted to obtain the input data item and wherein the ECC value is used for performing data comparison for the single encryption data type; and
      (b) an encrypted value obtained by applying the encryption algorithm identified by the external encryption unit to the input data item, wherein the encrypted value is used for decrypting the instance of the single encryption data type;
   receiving a request to perform a join operation of the table with another table using the column storing the important data;
   responsive to receiving the request to perform the join, performing a join by performing comparisons with the ECC values of the encrypted column of the DB;
   receiving a request for a value of the important data, the request identifying an instance of the single encryption data type; and
   determining the value of the important data by decrypting the encrypted value portion of the identified instance of the single encryption data type.

2. The method of claim 1, wherein the information identifying the encryption algorithm is associated with a security policy transmitted by the external encryption unit.

3. The method of claim 1, wherein the order preserving function is a hash function.

4. The method of claim 1, wherein the ECC is used in data search, data copy, index scan, scan filter, and like operations.

5. The method of claim 1, further comprising:
   creating an index based on the encrypted column.

6. The method of claim 1, wherein the encryption data type includes a foreign key.

7. The method of claim 1, wherein the encryption algorithm is a first encryption algorithm, the method further comprising:
   receiving information identifying a second encryption algorithm from the external encryption unit; and
   updating the encrypted column of the DB such that an updated instance of the single encryption data type stores (a) a new encrypted value obtained by encrypting the data item using the second encryption algorithm and (b) the same ECC value.

8. The method of claim 4, wherein the ECC is used in data search, data copy, index scan, scan filter, and like operations without being decrypted.

9. The method of claim 2, wherein the ECC has the same value if the security policy differs.

10. The method of claim 2, further comprising:
    retransmitting the security policy to the external encryption unit in the DB; and
    responsive to the DB receiving authorization authentication regarding the retransmitted security policy from the external encryption unit, decrypting the data in the encrypted column.

11. A database management system (DBMS) comprising a computer processor and a non-transitory computer-readable storage medium storing instructions for:
    receiving information identifying an encryption algorithm from an external encryption unit separate from the DB;
    storing an important data of a column of a table of the DB as a single encryption data type in an encrypted column of the DB, wherein an instance of the single encryption data type based on an input data item of the important data is obtained by combining:
       (a) an encrypted comparison code (ECC) value obtained by applying an order preserving function to the input data item, wherein the ECC value cannot be decrypted to obtain the input data item and wherein the ECC value is used for performing data comparison for the single encryption data type; and
       (b) an encrypted value obtained by applying the encryption algorithm identified by the external encryption unit to the input data item, wherein the encrypted value is used for decrypting the instance of the single encryption data type;
    receiving a request to perform a join operation of the table with another table using the column storing the important data;
    responsive to receiving the request to perform the join, performing a join by performing comparisons with the ECC values of the encrypted column of the DB;

receiving a request for a value of the important data, the request identifying an instance of the single encryption data type; and determining the value of the important data by decrypting the encrypted value portion of the identified instance of the single encryption data type.

12. The database management system of claim 11, wherein the information identifying the encryption algorithm is associated with a security policy transmitted by the external encryption unit.

13. The database management system of claim 11, wherein the order preserving function is a hash function.

14. The database management system of claim 11, wherein the ECC is used in data search, data copy, index scan, scan filter, and like operations.

15. The database management system of claim 11, wherein the encryption data type includes a foreign key.

16. The database management system of claim 14, wherein the ECC is used in data search, data copy, index scan, scan filter, and like without being decrypted.

17. The database management system of claim 12, wherein the ECC has the same value if the security policy differs.

18. The database management system of claim 12, wherein the non-transitory computer-readable storage medium further stores instructions for:

retransmitting the security policy to the external encryption unit; and responsive to the DB receiving authorization authentication regarding the retransmitted security policy from the external encryption unit, decrypting the data in the encrypted column.

19. A non-transitory computer readable storage medium storing a computer program product including computer instructions configured to cause a processor of a computer to perform encryption in a database (DB), the non-transitory computer readable storage medium storing instructions for:

receiving information identifying an encryption algorithm from an external encryption unit separate from the DB; and storing an important data of a column of a table of the DB as a single encryption data type in an encrypted column of the DB, wherein an instance of the single encryption data type based on an input data item of the important data is obtained by combining:

(a) an encrypted comparison code (ECC) value obtained by applying an order preserving function to the input data item, wherein the ECC value cannot be decrypted to obtain the input data item and wherein the ECC value is used for performing data comparison for the single encryption data type; and (b) an encrypted value obtained by applying the encryption algorithm identified by the external encryption unit to the input data item, wherein the encrypted value is used for decrypting the instance of the single encryption data type;

receiving a request to perform a join operation of the table with another table using the column storing the important data;

responsive to receiving the request to perform the join, performing a join by performing comparisons with the ECC values of the encrypted column of the DB;

receiving a request for a value of the important data, the request identifying an instance of the single encryption data type; and determining the value of the important data by decrypting the encrypted value portion of the identified instance of the single encryption data type.

20. The non-transitory computer readable storage medium of claim 19, wherein the information identifying the encryption algorithm is associated with a security policy transmitted by the external encryption unit.

21. The non-transitory computer readable storage medium of claim 19, wherein the order preserving function is a hash function.

22. The non-transitory computer readable storage medium of claim 19, wherein the ECC is used in data search, data copy, index scan, scan filter, and like operations.

23. The non-transitory computer readable storage medium of claim 20, wherein the ECC has the same value if the security policy differs.

24. The non-transitory computer readable storage medium of claim 20 further storing instructions for:

retransmitting the security policy to the external encryption unit; and responsive to the DB receiving authorization authentication regarding the retransmitted security policy from the external encryption unit, decrypting the data in the encrypted column.

25. The method of claim 5, further comprising:

receiving a query based on the important data in the column; and responsive to receiving the query, using the index based on the encrypted column for processing the query.

26. The non-transitory computer readable storage medium of claim 19, wherein the encryption data type includes a foreign key.

* * * * *